March 3, 1970    G. CORTELLESSA    3,497,965
MEANS AND METHOD FOR DEFROSTING FROZEN PRODUCTS
Filed Nov. 30, 1967

INVENTOR.
GIANCARLO CORTELLESSA

United States Patent Office 3,497,965
Patented Mar. 3, 1970

3,497,965
MEANS AND METHOD FOR DEFROSTING
FROZEN PRODUCTS
Giancarlo Cortellessa, Via Alessandro Severo 73,
Rome, Italy
Filed Nov. 30, 1967, Ser. No. 687,024
Claims priority, application Italy, Dec. 3, 1966,
43,329/66
Int. Cl. F26b 15/18, 25/00
U.S. Cl. 34—216        3 Claims

ABSTRACT OF THE DISCLOSURE

A means for defrosting frozen products comprising, a chamber in which the frozen products are placed on either a stationary foraminous support or are carried on a movable mesh conveyor, the chamber receiving a gaseous fluid such as steam which is whirled about in the chamber to impinge against the frozen products which receive the condensation of the steam, the steam being thermostatically maintained at a suitable defrosting temperature. The chamber has entrance and egress openings for the products, which openings have closures that are arranged to prevent the outflow of the steam when the products enter and leave the chamber.

---

Recently in the food storage industry, freezing techniques have achieved greater commercial importance and also the defrosting techniques for frozen products have reached a very useful status.

The present invention relates to defrosting means to be used with frozen food products and the apparatus employs for defrosting purposes, a mixture of air, steam, humid air and moist gaseous substances in turbulent flow, brought into direct contact with the frozen products.

In the accompanying drawing, wherein an illustrative embodiment of the invention is disclosed, FIG. 1A is a cut-away side view of an end portion of the apparatus, showing all of its components;

Figure 1A:
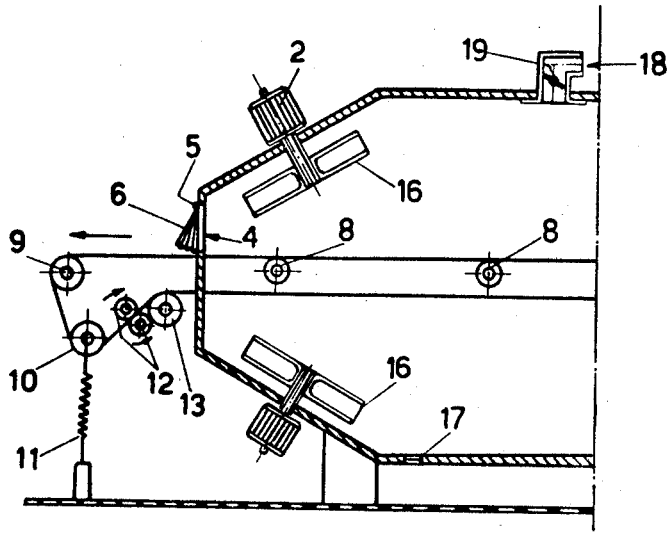
FIG. 1B is a similar view of the opposite end of the apparatus.
Figure 1B:
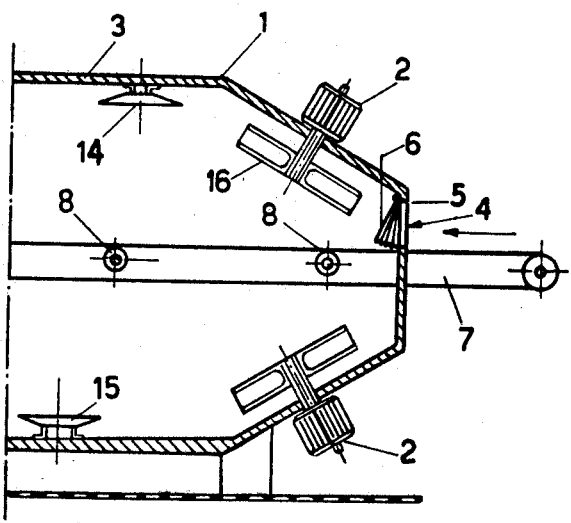

Referring to the drawing, the apparatus includes a room or chamber 1 provided with thermo-insulating walls 3. Electric motors 2 drive centrifugal fans 16, said motors being operated through an electric control not shown but of conventional form. The openings shown at 4 at the opposite ends of the casing forming the chamber, respectively permit the entrance and egress of the frozen products. The products are moved through the chamber 1, in the embodiment of FIGS. 1A and 1B, on a traveling conveyor belt 7. The said openings 4 are partly closed by doors 6 which are attached to the walls of the chamber 1 through bellows, which allow the doors to be opened during the passage of the products, but prevent the escape of steam. These doors 6 are hinged at 5. A discharge stack 18 and an air lock 19 therein assure the periodic air exchange in the interior of the room or chamber 1.

In accordance with the invention, the belt conveyor 7, upon which are loaded the frozen products, consists of a wire mesh or other foraminous belt having wide openings in it. This allows steam to pass through and reach the different products on the conveyor inside of the room or chamber. The conveyor 7 is supported by idler rollers 8, driven by a pulley 9 which is driven in by an electric motor or other power unit, not shown in the drawing. A conventional take-up gear 10 maintains belt tension constant. The take-up gear 10 is stressed by means of a suitably fastened spring 11 which acts on the take-up gear 10 when the belt conveyor is loaded with the products to be defrosted. The conveyor is maintained in its proper position by means of a spacer roller 13 and during its use the conveyor 7 is cleaned by means of a belt-cleaning device consisting of two circular brushes rotating in a direction opposite to the movement of the conveyor belt, the belt passing between these brushes, which are indicated at 12 in the drawing. The brushes can, if desired, have a built-in water sprayer for the purpose of securing good cleaning and for hygienic purposes.

Another feature of the invention consists in the provision of openings 14 and 15 for the inlet of steam or other gaseous substance, the entrance of the fluid being made through both openings 14 and 15 for the purpose of maintaining a constant temperature in the chamber 1. A thermostat can provide the automatic securement of the desired operating temperature since the steam admission can be controlled by the thermostat connected to any type of steam generator known to those skilled in this art.

The room or chamber 1 is provided with an exhaust valve 17 connected to a trap that allows the outlet of water but not the egress of the steam.

Figure 2:
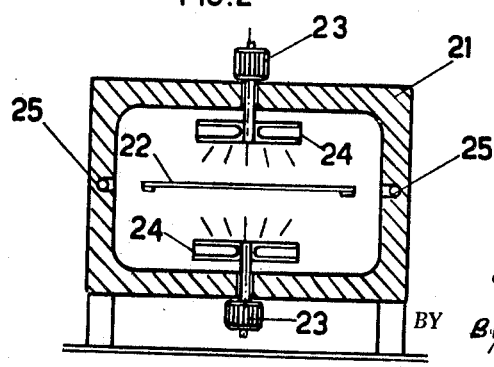
FIG. 2 is a sectional view of another embodiment of the apparatus.

In the embodiment of the apparatus shown in FIG. 2, the casing includes a thermo-insulated room or chamber 21; a loading grid 22 which may be stationary or movable and on which the frozen products are loaded for defrosting; the electric motors 23 for driving the fans 24 and the ducts 25 for the admission of the defrosting gaseous substance.

A distinctive feature of the invention, in the embodiment of FIG. 2 consists in the use of a thermostat to maintain the required operating temperature, and also controlling the steam admission from a conventional steam generator.

In carrying out the invention, the defrosting gaseous substance is caused to receive a whirling action by means of the centrifugal fans 16 and 24 driven by the respective motors 2 and 23. Water of condensation passes through the outlet 17 that is equipped with a trap. In the upper part of the room or chamber 1 the discharge stack 18 with the air lock 19 allows the periodic renewal of the air into the room.

Using the described device for the defrosting of frozen products, the steam at a relatively low temperature comes into contact in the inside of the room or chamber 1, or in the room or chamber 21, with the frozen products. The steam condenses on the surface of the products, transferring to them the heat of condensation and causing in this way, a progressive defrosting of the frozen products. Operating in this way, it is possible to eliminate any incidental cooking of the products and also any superficial drying up of the products which, when arriving at the outlet of the room or chamber and being discharged therefrom, maintain their initial humidity.

Another feature of the invention can reside in the use of vibration or shaking imparted to the products for aiding in their separation and resulting in a better and complete defrosting.

Having thus described an embodiment of the invention, it is obvious that the same is not to be restricted thereto but is broad enough to cover all structures coming within the scope of the annexed claims.

What I claim is:

1. A device for the defrosting of frozen products, said device including a casing provided with thermo-insulated walls, fans located within the casing, electric motors for driving the fans, the casing having openings for the inlet and egress of the products, a conveyor carrying the products through the casing, brushes operating on the conveyor for the elimination of residual material that might adhere to the conveyor, the casing having openings for the admission of steam, and a thermostat for the control of the operative temperature in the casing, and an outlet in the casing provided with a trap.

2. A device for the defrosting of frozen products according to claim 1, air locks by which the openings are partially closed, said air locks being connected to the walls of the casing, and bellows allowing opening of the said openings on the passage of the products through said openings while avoiding material loss of steam from the inside of the casing, the upper part of the casing having a discharge stack and an air intake securing the periodic replacement of the air inside of the casing.

3. A device for the defrosting of frozen products according to claim 1, in which the conveyor consists of a wire netting for the contact of the steam with the frozen products borne by the conveyor, supporting rollers on which said conveyor runs, an electrically-driven pulley over which the conveyor moves, a spring acting on a take-up roller for the conveyor when the conveyor is loaded with the products to be defrosted.

References Cited
UNITED STATES PATENTS

| | | |
|---|---|---|
| 3,071,473 | 1/1963 | Churley. |
| 3,220,333 | 11/1965 | Davison. |
| 3,320,945 | 5/1967 | Dunkelman _____ 99—234 XR |

KENNETH W. SPRAGUE, Primary Examiner

U.S. Cl. X.R.

34—242